(12) United States Patent
Liberge

(10) Patent No.: US 8,373,552 B2
(45) Date of Patent: Feb. 12, 2013

(54) METHOD OF EARLY WARNING FOR VEHICLE

(75) Inventor: Franck Liberge, Durtol (FR)

(73) Assignees: Compagnie Generale des Etablissements Michelin, Clermont-Ferrand (FR); Michelin Recherche et Technique S.A., Granges-Paccot (CH); TRW Automotive US, LLC, Livonia, MI (US)

( * ) Notice: Subject to any disclaimer, the term of this patent is extended or adjusted under 35 U.S.C. 154(b) by 310 days.

(21) Appl. No.: 12/937,041

(22) PCT Filed: Apr. 20, 2009

(86) PCT No.: PCT/EP2009/054644
§ 371 (c)(1), (2), (4) Date: Dec. 1, 2010

(87) PCT Pub. No.: WO2009/127733
PCT Pub. Date: Oct. 22, 2009

(65) Prior Publication Data
US 2011/0163865 A1 Jul. 7, 2011

(30) Foreign Application Priority Data

Apr. 18, 2008 (FR) ...................................... 08 52635

(51) Int. Cl.
*B60C 23/00* (2006.01)
*B60C 23/02* (2006.01)
(52) U.S. Cl. ........................................ 340/442; 340/438
(58) Field of Classification Search ....................... None
See application file for complete search history.

(56) References Cited

U.S. PATENT DOCUMENTS 8,279,054 B2 * 10/2012 Kuchler et al. ............... 340/442
2002/0044051 A1 * 4/2002 Sugisawa ..................... 340/442

FOREIGN PATENT DOCUMENTS

EP 1 184 208 A1 3/2002

\* cited by examiner

*Primary Examiner* — Travis Hunnings
(74) *Attorney, Agent, or Firm* — Fitzpatrick, Cella, Harper & Scinto

(57) ABSTRACT

Pre-alert device (1) for vehicle comprising an access (20) to data making it possible to define a journey, an access (10) to data relating to the pressure of at least one tire of a vehicle provided to make said journey, a test module (30) specially adapted, on the basis of a set of criteria making it possible to detect pre-alert conditions according on the one hand to data relating to pressure and on the other hand to data relating to the defined journey, to generate a pre-alert condition when at least one of the alert triggering conditions is satisfied.

9 Claims, 3 Drawing Sheets

METHOD OF EARLY WARNING FOR VEHICLE

Figure 1:
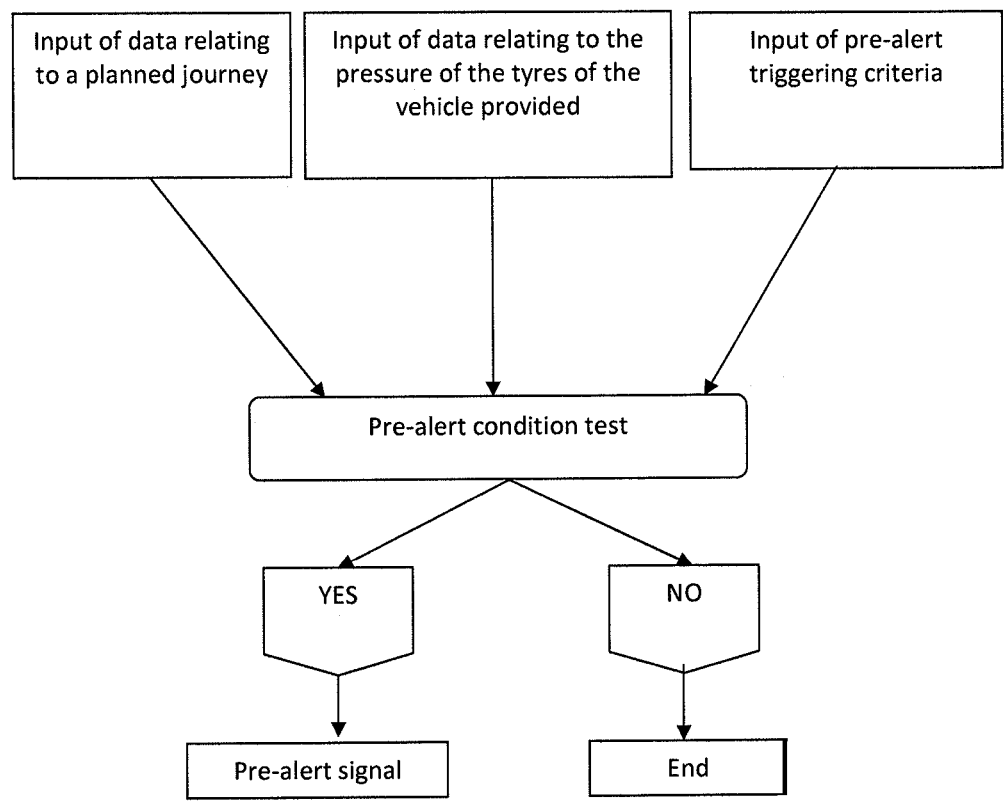

The present invention relates to a pre-alert method for vehicles making it possible to detect a possible pressure state pre-alert condition before this condition requires an immediate immobilization of the vehicle and, where appropriate, offering the driver a solution enabling him easily and quickly to take the necessary corrective actions (re-inflation, deflation, repair, etc. of the tyre or tyres affected).

A number of examples of devices or methods are known that use "hybrid" technologies comprising both means making it possible to measure the pressure of the tyres fitted on a vehicle, and navigation technologies, making it possible to locate and guide the vehicle along a given journey.

For example, document GB2420415 describes a device comprising both a system for measuring and indicating the pressure of the tyres, and a "GPS" type navigation system. The detection system makes it possible to detect any pressure loss condition when the vehicle is moving. When this condition occurs, the navigation system makes it possible to locate and display on the screen the nearest inflation point. It is a device that operates in real time: the pressure measurement system gives an alert to the navigation system which, according to the real-time position, presents one or more points of interest relating to inflation points or petrol stations.

Document EP1184208 describes a device comprising means for detecting the pressure conditions and a possible pressure loss condition of a vehicle and vehicle positioning means. In the event of pressure loss when the vehicle is moving, the device determines whether the vehicle can or cannot reach the nearest inflation or repair station, according to an assessment made of the rate of pressure loss of the tyre or tyres having generated the alert. It is also a device that operates in real time.

In addition to the interactive aspects between the system for measuring the pressure of the tyres and the navigation system, this device indirectly takes account of the parameters of the journey between the point of detection of pressure loss and the inflation site. It is not, however, a pre-alert given before departure, according to an overall journey between the departure and arrival points chosen by the user.

All these systems feature technologies that operate in real time, after a pressure loss has provoked an alert. These are critical situations, in which a rapid intervention is necessary, because running in degraded pressure mode cannot be sustained without bringing about certain risks associated with discomfort, driving difficulty, the risk of premature damage to the tyre concerned, even the risk of a total pressure loss forcing the driver to immobilize his vehicle.

To avoid these drawbacks, the invention firstly provides a pre-alert determination method for a vehicle intended to perform a planned journey, in which:
  data processing means having a test module are provided;
  means are provided to make it possible to obtain, for said vehicle, data relating to pressure for at least one of the tyres;
  said data relating to the pressure are supplied to said data processing means;
  a set of criteria is supplied to the data processing means making it possible to detect pressure state pre-alert conditions;
the method being characterized in that:
  certain physical characteristics relating to said journey to be made are supplied to the data processing means;
  said criteria making it possible to detect pressure state pre-alert conditions are linked on the one hand to the data relating to pressure and on the other hand to the physical characteristics relating to the planned journey;
  so that, on the basis of said planned journey, said data relating to the pressure and said pre-alert criteria, a test is performed using the data processing means to detect any pressure state pre-alert condition;
  if a pre-alert condition is detected, a corresponding signal is transmitted.

This method makes it possible to produce a pressure state pre-alert, before the departure of the vehicle, according to data linked to a planned journey and, above all, before a critical situation can occur on the road, and therefore before a conventional real-time detection.

Each type of journey comprises particular and often distinctive physical characteristics. The presence of certain physical characteristics of journeys has a direct impact on the tyre pressure values that are desirable to optimize the running conditions such as comfort, safety, fuel economy, and so on. According to the planned journey data, certain key characteristics can be sought and detected. According to the presence or otherwise of certain predefined characteristics, a pre-alert is or is not given.

With respect to a pre-alert, and therefore an alert given before the departure of the vehicle, unlike the known devices which operate in real time, the inventive method can operate even without a geolocation device.

According to a first advantageous embodiment:
  said data relating to pressure comprise at least one pressure value recommended for the tyres of the vehicle intending to make the journey, a datum relating to the presence or otherwise of a leak for at least one of the tyres of the vehicle, and, in the case of a leak, the value of the rate of pressure loss of the tyre concerned and the pressure value measured at a given instant (for example, immediately before or a little before the departure);
  said data relating to a journey to be made comprise at least the planned distance and/or duration of the journey; and
  a pre-alert condition is found if a leak is present and if the planned journey comprises a travel distance or time that is sufficient to enable the pressure value of said tyre to reach, during the journey, a value less than the recommended minimum pressure threshold.

According to a second advantageous embodiment:
  the data relating to pressure comprise a datum relating to the presence or otherwise of a leak for at least one of the tyres of the vehicle intending to make the journey;
  said data relating to a journey to be made comprise at least the value of the speed of the fastest section of the journey; and
  a pre-alert condition is found if a leak is present and if the planned journey comprises at least one portion on a road with a fairly high traffic speed (for example, a speed equal to or greater than 80 km/h and preferably equal to or greater than 90 km/h).

According to a third advantageous embodiment:
  the data relating to pressure comprise pressure values measured on the vehicle at a given instant (for example, before its departure), multiple recommended pressure data for the tyres of the vehicle according to the speed of said vehicle;
  said data relating to a journey to be made comprise at least the value of the speed of the fastest section of the journey; and
  a pre-alert condition is found if the planned journey comprises at least one portion for which the recommended pressure value is higher than the (current) value measured for at least one of the tyres of the vehicle provided to make the journey.

A pre-alert condition is advantageously found if the planned journey comprises at least one portion for which the recommended pressure value is greater than the (current) measured value by at least one given transition value (for example, the transition value can be 5 or 10% of the current pressure value).

According to a fourth advantageous embodiment:
- the data relating to pressure comprise a value of the difference, at a given instant (for example before the departure of the vehicle) between the values of the pressures of two tyres on one and the same axle, at least one given maximum difference value EM (and, if necessary, the measured pressure values of the two tyres on one and the same axle);
- said data relating to a journey to be made comprise at least the value of the speed of the fastest section of the journey; and
- a pre-alert condition is found if the established difference is greater than a given maximum difference value (EM), and if the planned journey comprises at least one portion on a road whose traffic speed is fairly high (preferably greater than 80 km/h, and even more preferably greater than 90 km/h).

Advantageously, a moving device is used that is mounted in a vehicle and comprises a microprocessor, said device being arranged to receive said data relating to pressure and, on the basis of a given journey, to perform a pre-alert test.

It may be a navigation device, linked by wired or wireless links to the pressure sensors of the tyres of the vehicle, and able to analyze the pressures values supplied by these detectors, or a navigation device linked to a system for measuring the pressure of the tyres fitted on the vehicle. The journey can be computed by the navigation device itself, which then comprises software suited to this function, or can originate from another source.

According to an advantageous variant, a computation device is used that comprises a microprocessor located outside (or remote from) the vehicle, said device being arranged to receive said data relating to pressure and, on the basis of a given journey, to perform a pre-alert test.

It may be a microcomputer located in a building. Data communication means of "wifi", "wimax" or "Bluetooth" or other type are provided so as to link a system for measuring the pressure of the tyres fitted on a vehicle to said microcomputer. The computer receives the data relating to the pressures of the tyres, and, on the basis of a given journey, performs a pre-alert test. The journey can be computed on the computer itself, which then includes software suited to this function, or can originate from another, adjacent or remote, source.

The pre-alert determination method is advantageously designed for use with a digital road network system stored on a memory medium and comprising a plurality of network elements such as nodes and/or sections and indications of the positioning of these nodes and/or sections, said elements being able on the one hand to be arranged in a reconstruction of a road network so as to form portions of roads and crossroads, and on the other hand to make it possible to determine, using the data processing means, at least one potential journey, which can link a departure point D and an arrival point A.

Figure 2:
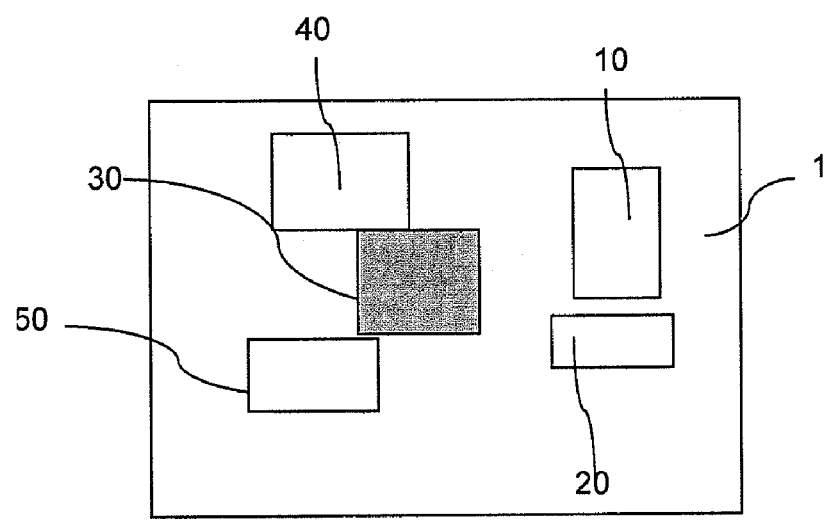
Figure 3:
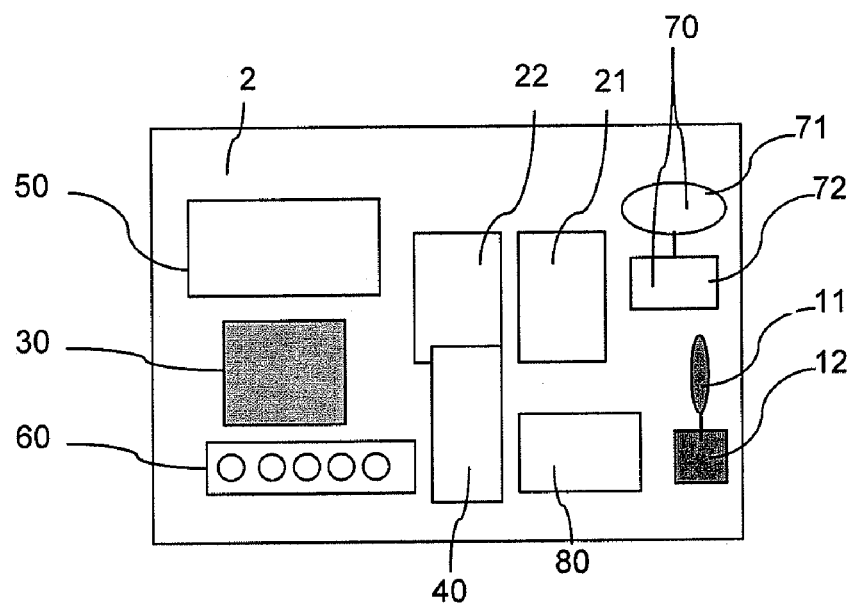
Figure 4:
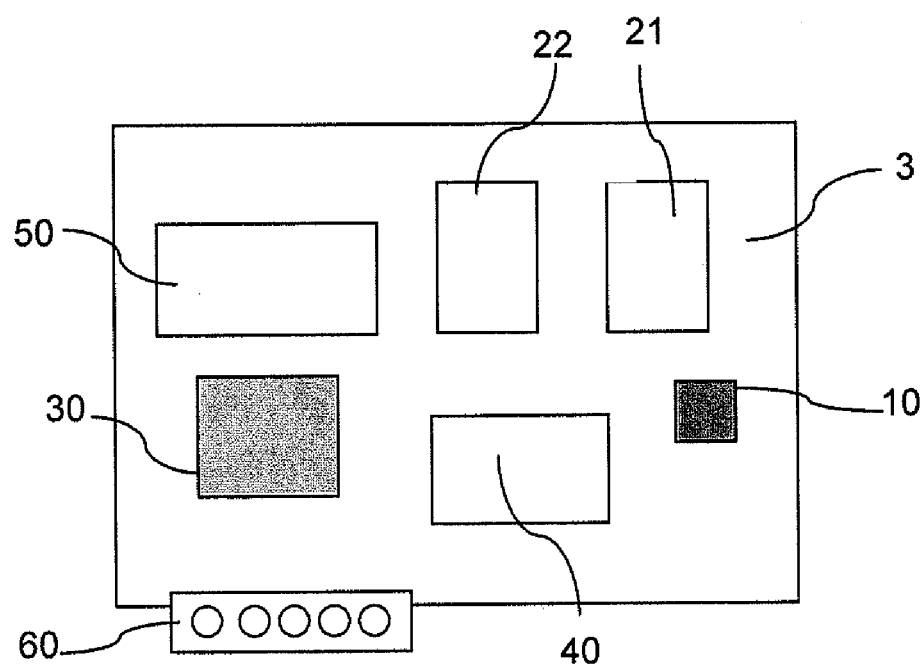

All the embodiment details are given in the description that follows, complemented by FIGS. 1 to 4 in which:

FIG. 1 gives a functional flow diagram diagrammatically illustrating the various steps of the method according to the invention;

FIG. 2 gives a diagrammatic representation of the pre-alert device according to the invention;

FIG. 3 diagrammatically illustrates a first embodiment of the pre-alert device; and FIG. 4 diagrammatically illustrates a second embodiment of the pre-alert device.

In the present description, the following terms are used in particular with the following meanings:

The expressions "pressure state pre-alert" or "pressure state warning" or "risk pre-alert condition associated with the pressure parameters and the planned journey" or "unfavourable pressure state pre-alert" or "pre-alert" are used to mean a state in which at least two different thresholds of technical and/or physical parameters are reached or exceeded and/or two conditions are satisfied. One of these parameters is directly or indirectly linked to the inflation pressure or more simply the pressure of at least one of the tyres of the vehicle provided to make a journey for which the pre-alert condition is to be verified. The other parameter or parameters is/are linked to the planned journey. In pre-alert mode, the tyres of the vehicle are in a state making it possible to run in adequate conditions, within certain limits, depending on the circumstances. If the parameter linked to pressure were to deteriorate beyond a critical threshold, the pre-alert condition could be replaced by an "under-inflation alert" condition.

The expression "under-inflation alert" or "under-inflation alert condition" is used to denote a condition in which the pressure of at least one of the tyres of the vehicle exhibits a value less than a given tolerance threshold. This threshold can be set according to various criteria, such as comfort, safety, road holding, etc. This alert level requires an immediate intervention on the part of the driver if he is running the vehicle, to remedy the situation.

The expression "journey computation system or device or module" or "guidance system or module" is used to denote a device comprising one or several hardware elements such as a processor, access to memory means or a database and making it possible to provide a user with the guidance or driving indications making it possible for the latter to run his vehicle and complete a desired journey by following the guidance instructions supplied by said system. Such a device is generally provided with processor means enabling it to determine a journey between a departure point D and an arrival point A.

The expression "geolocation or positioning system or device or module" is used to denote a device making it possible to receive one or more information items that make it possible, directly or by computation, to accurately determine the position of the device according to the latitude/longitude or Cartesian coordinates. The best known of these systems is the "GPS" system, or "Global Positioning System". This system operates with a set of satellites supplying the receivers with information making it possible to compute (by triangulation) their own coordinates. GPS is conventionally used to locate vehicles that are running on the road, airplanes, ships, etc.

The expression "tyre pressure measurement and management system" or "pressure monitoring system", often denoted by its English acronym "TPMS" (Tyre Pressure Management System), is used to mean a system making it possible at least to collect the pressure values of the tyres of a vehicle and supply an "output" for example in the form of an item of information linked to these values. This output can be an alert due to an under-inflation situation, an item of information concerning the pressure values present in the tyres, an alert notifying that a leak has been detected, and so on. A TPMS system can operate independently or be linked to other equipment of a vehicle, such as, for example, a screen with which to display the various states and alerts.

The expression "data relating to a journey" is used to denote the data that devolves from the journey, such as the travel time and distance, the speed on the various sections, and so on, and the data that make it possible to define the journey, such as the waypoints that will be followed (the nodes, sections, points of interest, etc.), and, where appropriate, the guidance instructions corresponding to this journey.

The expression "data relating to pressure" is used to denote data such as the absolute pressure values of the tyres and the values that are linked directly or indirectly to the pressure such as the presence of a leak, the rate of pressure loss, etc.

The expression "maximum difference" (EM) is used to denote the greatest acceptable value of pressure difference between two tyres on one and the same axle. For a typical passenger vehicle, this value is situated, for example, between 100 and 200 mbar, and preferably between 150 and 200 mbar.

FIG. 2 shows a diagrammatic representation of a pre-alert device 1 for vehicles according to the invention. It comprises an input 10 or access to data relating to pressure originating from at least one tyre of a vehicle provided to make said journey, a source 20 or access to data relating to a journey. It can be an external source or a journey computation module provided within the pre-alert device. A test module 30, having access on the one hand to the data relating to a planned journey and on the other hand to the data relating to the pressure of at least one tyre of the vehicle provided to make this journey, makes it possible to detect a possible pre-alert condition. The test module can comprise a microprocessor or other computation means, and test instructions or commands. The test parameters 40, stored in the device, or supplied before performing a test, make it possible to configure the test module so that the latter can identify the cases in which a pre-alert condition is present or not. FIG. 1, described later, illustrates the operating principle of the test module.

In the case of a pre-alert condition, a pre-alert output 50 makes it possible to obtain a corresponding signal. This signal can be used to send a message to the user, via a visual or audible signal, or even by sending a complete message. Such a message can, for example, explain the conditions that have caused a pre-alert mode to be generated, and, where appropriate, include a portion describing ways of correcting the situation. For example, the message can suggest that the user go to an identified inflation station before making the planned journey. A journey computation module, internal or external, can take into account the pre-alert condition to propose a journey to this station, namely by modifying the initially planned journey, or to propose an independent journey, intended to direct the vehicle to an inflation station. The means of processing the signal from the pre-alert output 50, the display means, and other elements enabling such functions can be provided outside the pre-alert device 1. A wired or wireless link can then be used for the data transfers.

The pre-alert device shown in FIG. 2 advantageously takes the form of two main embodiments. FIGS. 3 and 4 show examples of these two embodiments, namely a mobile mode, presented in FIG. 3, and a fixed mode, or out-of-vehicle mode, presented in FIG. 4.

FIG. 3 illustrates a diagrammatic representation of a pre-alert device 2 in mobile or vehicle-mounted version. This embodiment makes it possible to incorporate the device permanently or not in the vehicle provided to make the journey. A geolocation module 70 (optional) provided with an antenna 71 and a processing module 72 makes it possible to locate the vehicle in a digital mapping system. A journey computation module 21, which comprises software adapted to this function, and a map database 22 make it possible to perform journey computations. A pressure signal processing module 12 linked to an antenna 11 for receiving a tyre pressure signal makes it possible to receive and process the data relating to the pressure of at least one tyre of the vehicle. The test module 30, the test parameters 40, the pre-alert output 50 make possible the implementation as presented previously for the device of FIG. 2. A user interface 60 enables the driver of the vehicle to parameterize the device, enter any data, such as the information needed to generate a journey computation, and receive the resulting data and messages. An electrical power source 80, standalone or linked to the vehicle's electrical circuit, supplies the energy needed to operate the pre-alert device.

According to an embodiment variant, the data relating to the journey can originate from another source, for example a centralized server, performing a plurality of distinct journey computations intended for different users and transmitted, for example, by mobile telephony, or even from a journey computation module located in the vehicle, but separate from the pre-alert device 2.

FIG. 4 presents an embodiment of the pre-alert device 3 in fixed or out-of-vehicle mode. Such a device is advantageously implemented using a computer, installed outside the vehicle, close, or not close to the latter. An input 10 for data relating to the pressure of the tyres of the vehicle makes it possible to obtain, in real time or offline, a variety of data relating to the pressure of at least one of the tyres of the vehicle. The reception can be by direct link between the vehicle and the device 3, for example by wireless channel, or by indirect link, such as, for example, by mobile telephony, by Internet, or by any other type of public or private network for exchanging data.

The other modules of the device are similar to those presented previously for the mobile version of FIG. 3, apart from the geolocation module 70, which is not present in the fixed version. In FIG. 4, the various modules can be embodied by the conventional elements of a microcomputer. For example, the test module 30 is implemented by a microprocessor and the specifically adapted instructions are advantageously supplied by specifically designed software. The digital mapping data 22, the test parameters 40 and any other useful data, are provided in memory means internal or external to the computer. The user interface 60 is embodied by the peripheral devices of a computer such as the keyboard, the screen, the inputs and outputs, the mouse or other device for moving the cursor on the screen, the loudspeakers, etc. The data relating to the journey can be obtained on the computer itself, which then comprises software adapted to this function, or can originate from another source, adjacent or remote.

In one or other of the mobile or fixed embodiments, the data relating to the pressure advantageously originate from a pressure measuring and management system. This type of system is usually provided with pressure sensors installed in the wheels or in the tyres of the vehicle. The data relating to pressure are transmitted by radio wave, either continuously, or at regular intervals, or even on detection of an abrupt variation in pressure. A receiver and a central computation unit make it possible to receive and process the data. The result of this processing can be used to transmit information to the driver, either in audible form, and/or in visual form. To this end, numerous pressure monitoring systems are linked to a readout which can be dedicated to this function or a readout used to present various types of parameters of the vehicle and/or of its environment. The latter case is commonplace when the pressure monitoring system is supplied as original equipment.

Such pressure monitoring systems can also be provided as accessories. They can in this case be installed in any type of vehicle. A unit for receiving and processing radio waves is then installed inside the passenger compartment.

FIG. 1 illustrates the key steps of the implementation of the method and the device according to the invention. Firstly, the various data, originating from the various sources, are received: the data relating to a planned journey, the data relating to the pressure of the tyres of the vehicle provided to make the journey and the data relating to the pre-alert triggering criteria, if the latter are not previously present in the device.

According to an advantageous embodiment, the latter data can be provided permanently, and the user need not be concerned therewith. According to an embodiment variant, these data can be supplied by the user, for example using a menu provided on the user interface offering various choices according to various vehicle usage contexts, or according to the type of vehicle provided.

Once the data is available, the test module can perform the necessary test or tests to detect any pre-alert condition.

For the implementation of the method and the device according to the invention, various parameters must be considered. Firstly, in the parameters relating to pressure, in addition to the absolute pressure values for each of the tyres, the knowledge of the presence of a leak, any multiple pressure levels recommended according to speed, and the pressure difference between two tyres positioned on one and the same axle, are useful in determining certain pre-alert cases.

The multiple information items relating to the pressure of the tyres can be obtained by a tyre pressure measuring and management system.

With or without a pressure measuring and management system, the useful quantities are data linked to or dependent on the pressure, here designated "data relating to pressure". These are the following data in particular:

the real or current pressure value of at least one of the tyres of the vehicle provided to make the journey, the measurement being performed preferably at a time close to the planned departure time;

the recommended pressure threshold or thresholds: these are generally pressure values indicated by the vehicle manufacturer;

the presence or not of a leak: a tyre pressure measuring and management system is able to perform several measurements of the value of the pressure spaced apart in time. This characteristic enables the system to follow the trend of the pressure value versus time. By comparing this trend to pre-established leak threshold values, the presence of leaks can be detected. For example, a leak of the order of approximately 100 mbar/month can be detected with high reliability. This type of leak is often qualified as a "slow" leak since it does make it possible, within certain limits, to use the vehicle. As long as the total quantity of escaped air does not exceed a certain threshold, the pressure of the tyre can be within an appropriate usage range. After a certain time, the pressure value is located below the recommended pressure value, and the pressure measuring and management system can transmit an alert signal. At this stage, even if it is a "slow" leak, a corrective action must be undertaken very rapidly. Greater leaks can obviously also be detected. "Fast" is often used to qualify a leak of the order of 100 mbar/h or above;

the presence of a pressure imbalance on one and the same axle: the tyre pressure measuring and management system measures and compares the pressure values of the tyres on one and the same axle. Above a certain difference between the two values, for example for difference values of the order of 150 to 200 mbar or more, it is desirable to be able to avoid using the vehicle in certain conditions, in particular at high speeds. It should be noted that, in such a case, the pressure values of the tyres concerned can, for just one, or even for both tyres, be located within the recommended pressure limits.

Regarding the journey, certain parameters can be useful, such as the distance to be travelled and/or the duration of the journey (these two parameters being directly linked), the maximum speed encountered along the journey. Thus, according to the case considered, at least one of these parameters must be available. If all the data of the journey are available, the useful data can then be isolated from the rest.

According to the invention, four typical cases devolve from these information items: the first two cases are based on a detection over time of a leak on at least one of the tyres and on certain characteristics of a journey to be made.

The third case is based on recommended pressure threshold values that vary according to the running speed of the vehicle.

The fourth case is based on the detection of an imbalance in the pressure values for the tyres on one and the same axle.

Table 1 gives the main cases encountered. These cases will be described in more detail below.

TABLE 1 various typical cases according to parameters linked to the journey and parameters linked to pressure; for each case, the specific parameters to be known are also mentioned.

| Parameters | Presence of a leak | Recommended pressure level according to speed | ΔP tyres on one and the same axle |
|---|---|---|---|
| Length/duration of journey sufficient to reach pressure value < recommended pressure | Case 1 Rate of pressure loss | | |
| Maximum speed allowed on the fastest section of the journey | Case 2 Speed limit for pre-alert | Case 3 Values of multiple pressures recommended according to speed | Case 4 ΔP max allowed according to speed |

Regarding the first case, the value of the pressure can be greater than the recommended minimum threshold, or slightly below. On the other hand, there is an inflation gas leak on at least one tyre. Conventionally, with a pressure monitoring system of known type, this type of situation does not give rise to any alert. This situation is, however, not satisfactory since, after a certain time, the pressure value will be located at an unacceptable level, forcing the driver to consider a corrective action, even to immobilize his vehicle.

According to the invention, if such a leak is detected for example by the pressure measuring and management system and a journey provides a path such that it is probable that the under-inflation threshold will be reached or exceeded during the journey, the pre-alert mode is activated. To perform the tests relating to this first case, the data relating to pressure must include at least the following information: at least one pressure value recommended for the tyres of the vehicle provided to make the journey, a datum relating to the presence or absence of a leak for at least one of the tyres of the vehicle, and, in the case of a leak, the value of the rate of pressure loss of the tyre concerned and the real or current pressure value measured at a given instant, preferably as near as possible to the moment of departure.

The data relating to a journey to be made must, for their part, include at least the following information: at least the planned distance and/or duration of the journey.

Finally, according to this first case, the test makes it possible to check that a pre-alert condition is obtained if a leak is present and if the planned journey comprises a travel distance or time that is sufficient to allow the pressure value of said tyre to reach a value below the recommended minimum pressure threshold during the journey.

The underlying risk of this first case is that the tyre with a leak will be in an under-inflation state while the vehicle is travelling the planned journey. This is a first risk case associated with the pressure and planned journey parameters. Indeed, if the journey were modified for a substantially shorter journey, this risk could be reduced or eliminated.

In the second case, a leak must also have been detected. The presence of a leak implies a significant probability that there is an intrusive object still pressed into the tyre, more often than not in the tread. Running at a substantially high speed with this object present would risk provoking the ejection of the latter. This would have the effect of freeing the orifice created by this object when it penetrated through the tyre, which would lead to a deflation of the tyre in a few moments (seconds or minutes, depending on case, according in particular to the size of the opening).

Thus, to alert the driver that he is in a risk situation, if a journey comprises a portion with a substantially high speed (for example greater than 80 km/h, even 90 or even 110 km/h) the pre-alert mode is activated.

To perform the tests relating to this second case, the data relating to pressure must include at least the following information: a datum relating to the presence or absence of a leak for at least one of the tyres of the vehicle provided to make the journey.

The data relating to a journey to be made must for their part include at least the following information: the value of the speed of the fastest section of the journey.

Finally, according to this second case, the test makes it possible to check that there is a pre-alert condition if a leak is present and if the planned journey includes at least one portion of travel on a road with a traffic speed that is fairly high (for example, a speed equal to or greater than 80 km/h, and preferably equal to or greater than 90 km/h, or even higher).

The driver warned by such a pre-alert can check whether a perforating object is still present in the tyre. If such is the case, the wisest solution is to remove this object and make the corresponding repair to the tyre.

The underlying risk in this case is that the tyre with a leak will be in an under-inflation state, or there will be a substantially abrupt or total pressure loss, while the vehicle is travelling the planned journey. This is a second risk case associated with the pressure and planned journey parameters. Indeed, if the journey were to be modified for a journey that included no high speed portion, this risk could be reduced or eliminated.

The third case is centred on the running speed along the planned journey. Many vehicles include recommended pressure indications that vary according to speed. For example, for certain vehicles, the recommended pressure threshold can vary by 300 mbar between the recommended limit values. Thus, according to the real measured pressure values and the data of a journey including at least one high-speed portion, an under-inflation situation can occur for this portion of the journey. If such is the case, the pre-alert mode is then activated.

To perform the tests relating to this third case, the data relating to pressure must include at least the following information: pressure values measured on the vehicle at a given instant (for example before its departure), the multiple recommended pressure data for the tyres of the vehicle according to the speed of said vehicle.

The data relating to a journey to be made must for their part include at least the following information: the value of the speed of the fastest section of the journey.

Finally, according to this third case, the test makes it possible to check that there is a pre-alert condition if the planned journey includes at least one portion of travel for which the recommended pressure value is greater than the value measured for at least one of the tyres of the vehicle provided to make the journey. A margin can, if necessary, be applied, to avoid a re-inflation if the pressure difference is minimal.

This is a third risk case associated with the pressure and planned journey parameters. Indeed, if the journey were to be modified for a journey including no high-speed portion, this risk could be reduced or eliminated.

Finally, the fourth case relates to a pressure imbalance mode on one and the same axle. In this case, all the tyres may have pressure values that conform to the recommended values. On the other hand, if a pressure value difference between the two tyres on one and the same axle exceeds a given threshold (for example 150 to 200 mbar or above, or approximately 8 to 10% of the nominal pressure value), the pre-alert mode is activated for any journey including a high-speed portion (for example 110 km/h or above and preferably 130 km/h). The underlying risk of this case is that the pair of tyres with the pressure imbalance will cause the vehicle to behave unusually. For example, a pressure imbalance can lead to a tendency of the vehicle to go to one side or the other, according to the configuration and the greater or lesser level of this imbalance. Specifically, it is at high speed that the pressure difference has the greatest impact on the behaviour of the vehicle. The latter may have a tendency to "pull" to the left or to the right depending on the case.

To perform the tests relating to this fourth case, the data relating to pressure must include at least the following information items: where appropriate, the measured pressure values of the two tyres on one and the same axle, a value of the difference, at a given instant (for example before the departure of the vehicle) between the pressure values of two tyres on one and the same axle, at least a given maximum difference value EM.

The data relating to a journey to be made must for their part include at least the following information: the value of the speed of the fastest section of the journey.

Finally, according to this fourth case, the test makes it possible to check that there is a pre-alert condition if the established difference is greater than a given maximum difference value EM, and that the planned journey includes at least one travel portion on a road with a fairly high traffic speed (preferably greater than 80 km/h, and even more preferably, greater than 90 km/h).

This is a fourth risk case associated with the pressure and planned journey parameters. Indeed, if the journey were to be modified for a journey including no high-speed portion, this risk could be reduced or eliminated.

In all these cases, the pre-alert mode makes it possible to warn the driver before he undertakes the planned journey. He thus has the possibility of applying the necessary corrective actions before his departure to avoid being in a situation which, in several cases, would then require urgent action on the part of the driver.

According to an embodiment variant, a journey computation module makes it possible to indicate to the driver a modified journey making it possible to be directed, if necessary, to an inflation point, in particular for the first two cases stated.

In these various exemplary embodiments, it is also possible to provide maximum under-inflation or rate of pressure loss value thresholds corresponding to those usually used by the pressure monitoring systems. When these thresholds are crossed, the pre-alert conditions, which correspond to conditions during which the vehicle can run, are replaced by alert conditions, requiring a corrective action such as re-inflation or repair before making a new journey.

The invention claimed is:

1. A pre-alert determination method for a vehicle intended to make a planned journey, in which the vehicle includes a data processor with a test module and a pressure measuring system for obtaining pressure data relating to a pressure of a tyre and supplying the pressure data to the data processor, wherein the data processor detects a pressure-state pre-alert condition based on a set of criteria, the method comprising:
supplying journey data relating to a planned journey to the data processor;
processing, by the data processor, a test based on the set of criteria, the pressure data, and the journey data;
detecting, by the data processor, from a result of the test, whether a pressure-state pre-alert condition exists; and,
if a pre-alert condition is detected to exist, transmitting a corresponding signal.

2. A pre-alert determination method according to claim 1, wherein the pressure data includes at least one of: a pressure value recommended for tyres of the vehicle, data relating to whether there is a leak in a tyre of the vehicle, and, if there is a leaking tyre, a value for a rate of pressure loss in the leaking tyre and a pressure value in the leaking tyre measured at a given instant,
wherein the journey data includes at least one of: a travel distance of the planned journey, and a travel duration of the planned journey, and
wherein the pre-alert condition is detected to exist if there is a leak in a tyre of the vehicle and if at least one of the travel distance and the travel duration is sufficient for the pressure value of the leaking tyre to reach, during the planned journey, a value less than a recommended minimum pressure threshold.

3. A pre-alert determination method according to claim 1, wherein the pressure data includes data relating to whether there is a leak in a tyre of the vehicle,
wherein the journey data includes a value of a speed of a fastest section of the planned journey, and
wherein the pre-alert condition is detected to exist if there is a leak in a tyre of the vehicle and if the planned journey includes the vehicle travelling on a road with a traffic speed above a threshold speed.

4. A pre-alert determination method according to claim 1, wherein the pressure data includes a pressure value of a tyre of the vehicle measured at a given instant, and multiple recommended pressure values for tyres of the vehicle, the multiple recommended pressure values respectively corresponding to multiple speeds of the vehicle,
wherein the journey data includes a value of a speed of a fastest section of the planned journey, and
wherein the pre-alert condition is detected to exist if the planned journey includes a portion in which a recommended pressure value is higher than a value measured for a tyre of the vehicle.

5. A pre-alert determination method according to claim 4, wherein the pre-alert condition is found if the planned journey includes a portion for which the recommended pressure value is higher than the value measured for the tyre by at least one given transition value.

6. A pre-alert determination method according to claim 1, wherein the pressure data includes a difference value, at a given instant, between pressure values of two tyres on a same axle of the vehicle, and a given maximum difference value (EM),
wherein the journey data includes a value of a speed of a fastest section of the planned journey, and
wherein the pre-alert condition is detected to exist if the difference is greater than the given maximum difference value (EM), and if the planned journey includes a portion on a road with a traffic speed above a threshold speed.

7. A pre-alert determination method according to claim 1, wherein the method utilizes a mobile device mounted on the vehicle, the mobile device including a microprocessor, and
wherein the mobile device receives the pressure data and performs a pre-alert test based on the planned journey.

8. A pre-alert determination method according to claim 1, wherein the method utilizes a computation device located outside the vehicle, the computation device including a microprocessor, and
wherein the computation device receives the pressure data and performs a pre-alert test based on the planned journey.

9. A pre-alert determination method according to claim 1, wherein the method is used in a digital road network system stored on a memory medium, the system including information on a plurality of elements and information on positions of the elements, the elements being able to be arranged in a reconstruction of a road network so as to form portions of a road and crossroads, and the elements being usable by the data processor to link a departure point D and an arrival point A for the planned journey.

* * * * *